Figure 1:
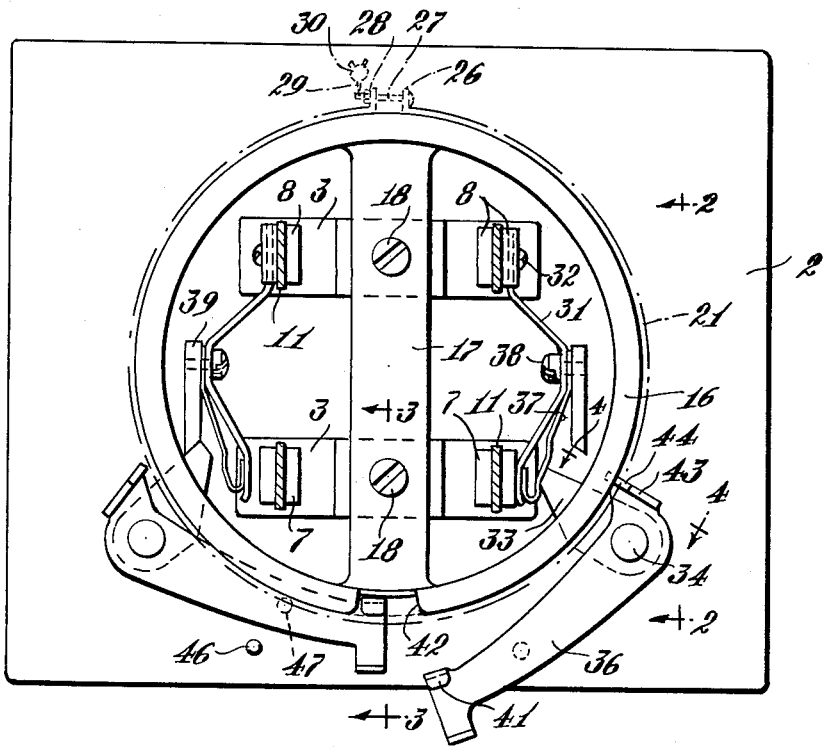

May 2, 1961  K. H. FOSKETT  2,982,828
ELECTRICAL SOCKET FOR PLUG-IN INSTRUMENTS
Filed July 23, 1959

INVENTOR.
Kenneth H. Foskett
BY
Roberts, Cushman & Grover
ATT'YS

United States Patent Office 2,982,828
Patented May 2, 1961

2,982,828
ELECTRICAL SOCKET FOR PLUG-IN INSTRUMENTS

Kenneth H. Foskett, Manchester, N.H., assignor, by mesne assignments, to Basic Products Corporation, West Milwaukee, Wis., a corporation of Wisconsin Filed July 23, 1959, Ser. No. 828,995

6 Claims. (Cl. 200—51.1)

While this invention is useful with any plug-in instrument which is sealed in place, it is particularly useful with watt-hour meters which are sealed with a sealing ring in well-known manner to prevent unauthorized access to the interior of the sockets. When such instruments are removed for testing or repairs it is desirable to by-pass the socket jaws into which the meter blades are plugged so that the current is not interrupted. Various by-passes have been proposed but none of them has been entirely satisfactory.

Objects of the present invention are to provide a by-pass which prevents the seal from being applied while the by-pass is closed, which cannot be closed while the meter is sealed, which can be closed before the meter is removed, which can be applied to a socket merely by adding a few simple parts without replacing any existing parts, which cannot be opened accidentally, which is visible and easily accessible when the meter is removed, and which is durable and reliable in use.

According to the present invention the socket has an actuator for moving the by-pass between open and closed positions, the actuator including a part outside the box which is movable from normal position, in which the sealing means can be removed, to by-passing position in the path of the sealing means so that the sealing means cannot be reapplied until the actuator has been returned to normal position. Preferably the by-pass includes a leaf spring having one end connected to one jaw of a pair and the other end movable into engagement with the other jaw of the pair, the latter end being pressed against the jaw yieldingly so as to maintain contact when the jaw springs away upon removal of the meter. The aforesaid actuator extends under the sealing means so that it cannot be moved to by-passing position until the meter is unsealed.

In a more specific aspect the invention involves a box having one or more pairs of jaws to receive a plug-in meter or the like, a cover having an opening for the meter, a sealing ring fitted around the opening for sealing a meter to the cover, a by-pass for interconnecting the jaws of each pair, an actuator for moving the by-pass between open and closed positions, the actuator including a part outside the box, said part having a hook held by the sealing ring when the by-pass is open, thereby to prevent the by-pass being closed while the ring is in place, and the part having a nose extending into the path of the ring when the by-pass is closed, thereby to prevent the replacement of the ring while the by-pass is closed. In the preferred embodiment the actuator includes an arm pivotally mounted on the outside of the cover to swing toward and from the meter opening about an axis intermediate its ends, one end of the arm hooking under the sealing ring when the by-pass is open, thereby to prevent the by-pass from being closed while the ring is in place, and the other end of the arm extending into the path of the ring when the by-pass is closed, thereby to prevent the replacement of the ring while the by-pass is closed.

Figure 2:
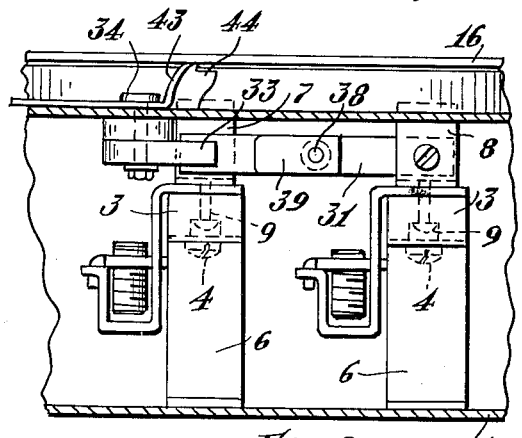
Figure 3:
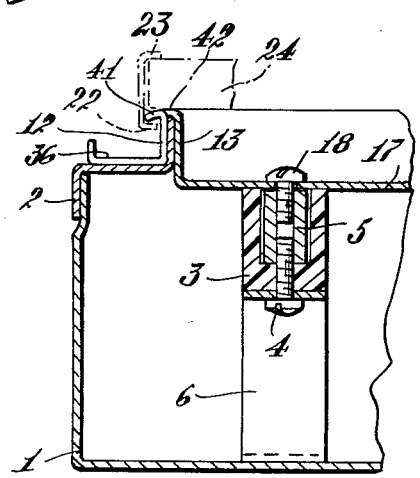
Figure 4:
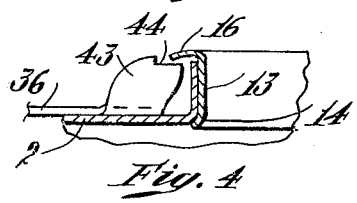

For the purpose of illustration a typical embodiment of the invention is shown in the accompanying drawing in which:

Fig. 1 is a front view of a socket having two pairs of jaws, with one by-pass open and one closed;
Fig. 2 is a section on line 2—2 of Fig. 1;
Fig. 3 is a section on line 3—3 of Fig. 1; and
Fig. 4 is a section on line 4—4 of Fig. 1.

In the illustration the invention is shown as applied to a socket of well-known construction comprising a rectangular box 1, a cover 2 telescoping over the open mouth of the box, blocks of insulation 3 fastened with screws 4 and nuts 5 on supports 6 fast to the back of the box, pairs of jaws 7 and 8 mounted on the insulation blocks by means of screws 9, the jaws being adapted to receive the meter blades 11 which are shown in section in Fig. 1. The cover 2 has an opening in front of the meter jaws to receive the meter and an out-turned flange 12 surrounding the opening. Fast in the opening is a ring 13 having its inner and outer edges 14 and 16 bent over the flange 12 to hold the ring in position (Fig. 4). Extending across the middle of the ring is a bridge 17 which is secured to the blocks of insulation by means of screws 18 which thread into the same nuts 5 which hold the screws 4 (Fig. 3). The meter is held in place by a sealing ring 21 having an inner flange 22 engaging under the flange 16 of ring 13 and an outer flange 23 overlapping the base of the meter 24. As shown in Fig. 1 the ends of the sealing ring have out-turned flanges 26 held together by a screw 27 and nut 28, the parts being sealed against unauthorized removal by means of a wire 29 extending through an opening in the end of the screw and a seal 30 uniting the ends of the wire. Inasmuch as the foregoing is well-known construction it need not be further described for the purpose of the present invention.

According to this invention one end of a leaf spring 31 is connected to the jaw 8 of each pair of jaws 7—8 by means of a screw 32, the other end of the spring being movable into and out of engagement with the other jaw 7 of each pair. Each spring is so shaped that its other end normally springs out of engagement with the jaw 7 as shown at the left side of Fig. 1, and said other end is movable into engagement with the jaw 7 by means of an arm 33 fast to the shaft 34 extending through the cover 2 to an actuating arm 36 outside the cover. Interposed between the free end of the arm 33 and the spring 31 is another spring 37 which is flexed when the leaf spring is pressed against the jaw so that the leaf spring follows the jaw as it springs inwardly when the meter blades 11 are withdrawn. Mounted at the middle of each leaf spring by means of a screw 38 is an arm 39 engageable with the arm 33 positively to move the leaf spring away from the jaw 7 when the actuator 36 is swung to the normal position shown at the left of Fig. 1.

To prevent the by-passes from being closed while the sealing ring 21 is in place, the free ends of the arms 36 are provided with hooks 41 which hook under the sealing ring as shown in Fig. 3, the flange 16 being cut away at 42 to accommodate these hooks. The other ends of the actuating arms 36 are provided with bent-up flanges 43 having noses 44 which extend into the path of the sealing ring when the by-pass is closed, thereby making it impossible to seal a meter in place without first opening the by-passes. To hold the actuating arm 36 in by-passing position the cover is provided with dimples 46 fitted into recesses 47 in the arms 36, the arms having sufficient resiliency to ride over dimples 46 and snap into by-passing position.

From the foregoing it will be evident that in removing a meter the sealing ring 21 is first removed, the arms 36 are then swung to the position shown at the right of Fig. 1 thereby closing the by-passes. Thus when the meter is removed the current is not interrupted. After a meter has been plugged in again the sealing ring 21 cannot be reapplied until the arms 36 are swung back to the position shown at the left of Fig. 1.

It should be understood that the present disclosure is for the purpose of illustration only and that this invention includes all modifications and equivalents which fall within the scope of the appended claims.

I claim:

1. A socket comprising a box having a pair of jaws to receive a plug-in meter or the like, sealing means to seal the meter to the box, a by-pass for interconnecting said jaws, and an actuator for moving the by-pass between open and closed positions, said actuator including a part outside the box which is movable from normal position, in which said sealing means can be removed, to by-passing position in the path of the sealing means so that the sealing means cannot be reapplied until the actuator has been returned to normal position, said part extending under the sealing means so that it cannot be moved to by-passing position until the meter is unsealed.

2. A socket according to claim 1 wherein the by-pass has a portion movable into and out of contact with one jaw of said pair, the actuator pressing the portion yieldingly against the jaw so as to maintain contact when the jaw springs away upon removal of the meter.

3. A socket according to claim 2 wherein the by-pass includes another portion detachably connected to the other jaw of the pair.

4. A socket according to claim 3 wherein the by-pass comprises a leaf spring connected to said other jaw.

5. A socket comprising a box having a pair of jaws to receive a plug-in meter or the like, a cover having an opening for the meter, a sealing ring fitted around the opening for sealing a meter to the cover, a by-pass for interconnecting said jaws, and an actuator for moving the by-pass between open and closed positions, the actuator including a part outside the box, said part having a hook held by the sealing ring when the by-pass is open, thereby to prevent the by-pass being closed while the ring is in place, and said part having a nose extending into the path of the ring when the by-pass is closed, thereby to prevent the replacement of the ring while the by-pass is closed.

6. A socket comprising a box having a pair of jaws to receive a plug-in meter or the like, a cover having an opening for the meter, a sealing ring fitting around the opening for sealing a meter to the cover, a by-pass for interconnecting said jaws, and an actuator for moving the by-pass between open and closed positions, the actuator including an arm pivotally mounted on the outside of the cover to swing toward and from the opening about an axis intermediate its ends, one end of the arm hooking under the sealing ring when the by-pass is open, thereby to prevent the by-pass from being closed while the ring is in place, and the other end of the arm extending into the path of the ring when the by-pass is closed, thereby to prevent the replacement of the ring while the by-pass is closed.

References Cited in the file of this patent
UNITED STATES PATENTS

| | | |
|---|---|---|
| 1,224,880 | Kries | May 1, 1917 |
| 1,231,229 | Ahlstrom | June 26, 1917 |
| 2,838,626 | Kuhn | June 10, 1958 |